United States Patent [19]
O'Keefe

[11] 3,885,591
[45] May 27, 1975

[54] TUNABLE FLUIDIC OSCILLATOR

[75] Inventor: Robert F. O'Keefe, Trumbull, Conn.

[73] Assignee: Automatic Switch Company, Florham Park, N.J.

[22] Filed: June 14, 1973

[21] Appl. No.: 370,121

[52] U.S. Cl. ..... 137/826; 137/624.14; 137/201 ME
[51] Int. Cl. ..... F15c 3/04
[58] Field of Search ...... 137/624.14, 805, 821, 814, 137/826; 235/201 ME, 201 PF

[56] References Cited

UNITED STATES PATENTS

| | | | |
|---|---|---|---|
| 2,760,511 | 8/1956 | Groff | 137/624.14 X |
| 3,605,779 | 9/1971 | Bauer | 137/805 |
| 3,682,189 | 8/1972 | Fapinas | 137/821 X |
| 3,683,951 | 8/1972 | Beaumont | 137/821 U X |

*Primary Examiner*—Alan Cohan
*Attorney, Agent, or Firm*—Breitenfeld & Levine

[57] ABSTRACT

A fluidic oscillator includes a fluidic multivibrator, and a volume chamber. A fluidic amplifier, connected to a pressure source, responds to the binary 0 and 1 outputs of the multivibrator for charging the volume chamber or allowing it to become discharged. A pair of biased isolators couple the volume chamber to the inputs of the multivibrator and apply thereto binary signals. When charging raises the pressure in the chamber to a predetermined level the binary signals to the multivibrator cause its output to change state, from 0 to 1, thereby discharging the chamber. As the pressure drops to a lower predetermined level the signals to the multivibrator change and cause it to change its output state from 1 to 0, thereby charging the chamber. The charging and discharging occurs at a periodic rate which may be varied by changing the capacity of the volume chamber and/or the setting of a variable restrictor located between the volume chamber and the pressure source. A pressure responsive drive may be used to vary the capacity of the volume chamber on the setting of the restrictor.

5 Claims, 9 Drawing Figures

TUNABLE FLUIDIC OSCILLATOR

The subject invention relates to oscillators, and in particular to a fluidic oscillator which is continuously tunable over a range of frequencies.

One possible use for an oscillator according to the invention is in connection with dust collecting apparatus. Dust collecting apparatus utilizes filter bags upon which, with use, a dust buildup takes place. This dust buildup is usually removed by shaking the bags periodically by applying high pressure air pulses to them. Since the dust buildup is variable, the rate at which air pulses are applied to the filter bags should also be variable. The latter suggests the use of a variable frequencey oscillator, responsive to the dust buildup rate, for modulating a high pressure source to provide high pressure air pulses at an appropriate frequency to the bags. It happens that the pressure differential between the interior and exterior of each filter bag is related to the dust buildup on the bag, i.e., the more dust, the greater the pressure differential.

Accordingly, it is an object of the present invention to provide a fluidic oscillator whose frequency of oscillation is responsive to pressure differentials.

It is another object of the present invention to provide an oscillator having a variable volume chamber for varying the oscillator's frequency of oscillation.

It is still another object of the present invention to provide an oscillator having a variable restrictor for varying the oscillator's frequency of oscillation.

In summary, the invention includes a fluidic oscillator, comprising: a fluidic bistable multivibrator having two input ports and an output port; a volume chamber; means for charging the volume chamber when the output port is in a first binary state and discharging the volume chamber when the output port is in a second binary state; and means, coupling the volume chamber to the input ports, for changing the output of the multivibrator from the first state to the second state when pressure in the volume chamber rises above a predetermined level and for changing the output of the multivibrator from the second state to the first state when pressure in the volume chamber drops below another predetermined level, whereby the states at the output port change periodically. The frequency of the periodic state changes can be varied, according to the invention, with means for controlling the rate of change of pressure in the volume chamber. In one example of such an oscillator, the volume chamber has a variable capacity and pressure differentials are used to vary the capacity. As a result, the pressure differentials control the rate of change of pressure in the chamber and the frequency of the oscillator. In another example, a restrictor through which the volume chamber is filled is variable, to change the rate of flow to the chamber, in response to pressure differentials. As a result, the pressure differentials control the rate of change of pressure in the chamber.

The foregoing and other objects and features of the invention are incorporated in an embodiment of the invention to be described below with reference to the accompanying drawings, in which:

FIG. 1 is a schematic diagram of a tunable fluidic oscillator, according to the invention;

FIGS. 2*a–d* sequentially show the logic states of a multivibrator of the oscillator;

Figure 1:
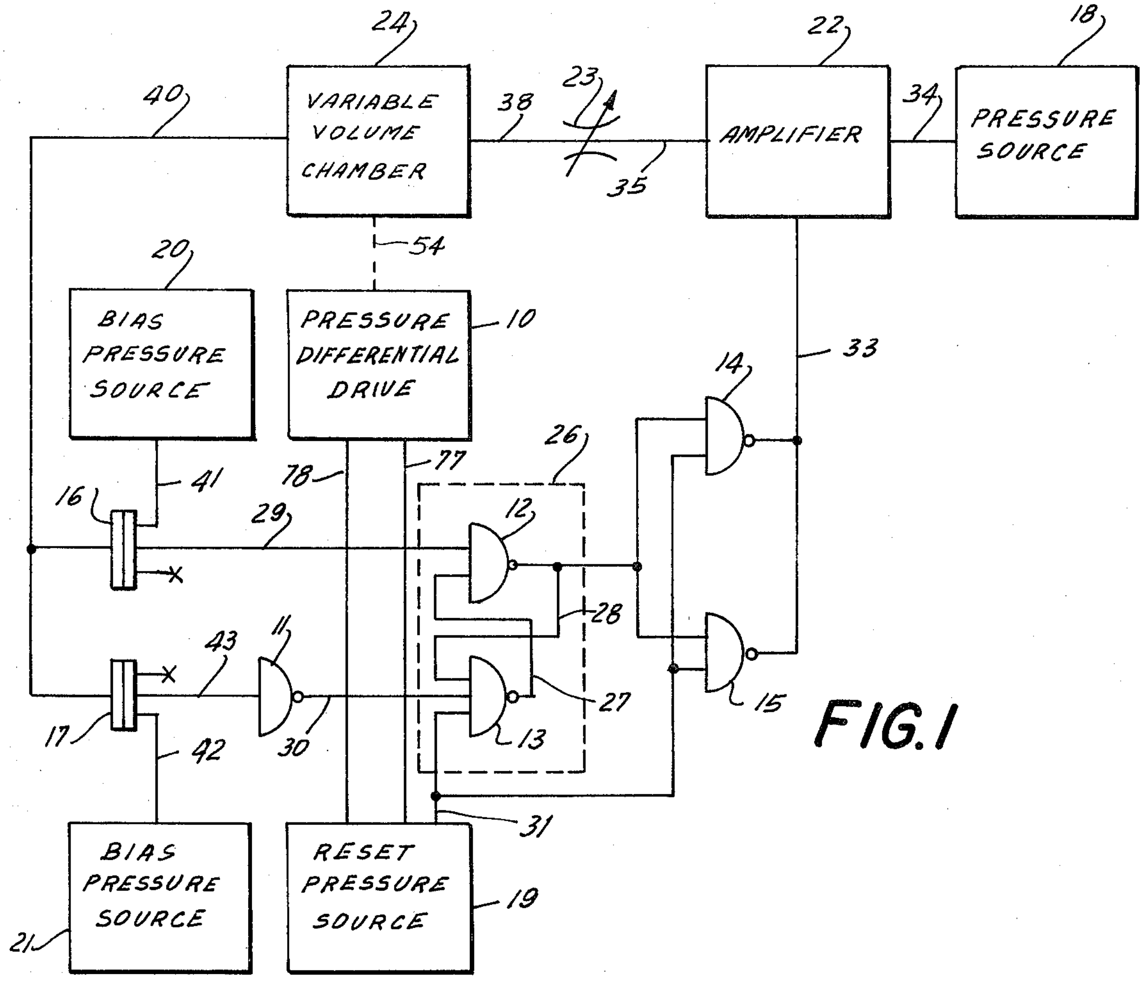

FIG. 1 shows a schematic diagram of a fluidic oscillator, according to the invention, whose frequency of oscillation is controlled by a drive 10 sensitive to pressure differentials. Generally, the oscillator includes an inverter 11, NOR gates 12–15, isolators 16 and 17, pressure sources 18–21, and an amplifier 22 for charging and discharging, via a variable restrictor 23, a variable volume chamber 24.

The inverter 11 and NOR gates 12–15 may be provided in a variety of forms. Package structures are available which include a plurality of NOR logic elements and inverters. Such structures are shown in U.S. Pat. Nos. 3,512,558 and 3,495,608. Isolators 16 and 17 are illustrated and described in U.S. Pat. application Ser. No. 737,870, filed June 18, 1968 (now abandoned) and are sold by Automatic Switch Company of Florham Park, N.J., U.S.A. under Catalog No. 6080040. A suitable fluidic amplifier 22 is shown in U.S. Pat. No. 3,507,295.

Figure 2A:
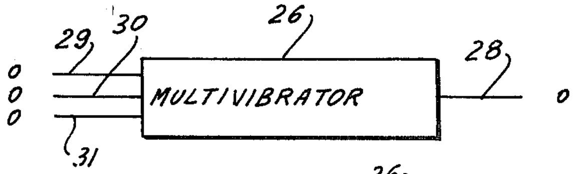
Figure 2B:
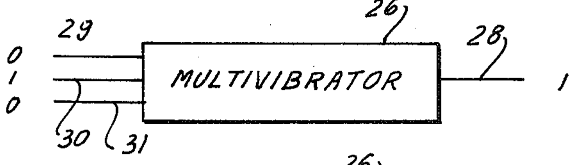
Figure 2C:
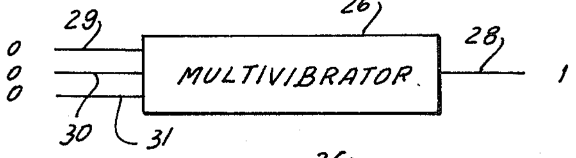
Figure 2D:
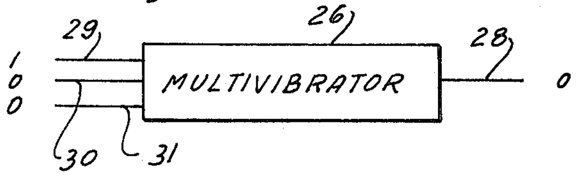

The oscillator includes a fluidic bistable multivibrator 26 composed of NOR gates 12 and 13, a line 27 connecting the output port of NOR gate 13 to an input port of NOR gate 12, and a line 28 connecting the output port of NOR gate 12 to an input port of NOR gate 13. As is known, a NOR gate produces a binary 1 output when all its inputs receive binary 0 signals. If a binary 1 is applied to any input of the NOR gate, its output is a binary 0. Binary input signals to multivibrator 26 are provided by line 29, which is connected to an input port of NOR gate 12, and by lines 30 and 31, which are connected to input ports of NOR gate 13. The output binary signal of the multivibrator is provided on line 28. Operatively, if it is assumed that a binary 0 is present on line 31, when binary 0s are present on lines 29 and 30 a binary 0 is present on line 28 (see FIG. 2*a*). If, subsequently, the binary 0 on line 30 is changed to a binary 1, the binary 0 on line 28 changes to a binary 1 (see FIG. 2*b*). Thereafter, a change back on line 30 to binary 0 leaves the binary 1 on line 28 unaffected (see FIG. 2*c*). With binary 0 s on lines 29 and 30 and a binary 1 on line 28, a binary change to 1 on line 29 drives line 28 to a binary 0 (see FIG. 2*d*). As more fully described below, the sequence described takes place at the oscillation frequency of the oscillator.

The remainder of the oscillator circuit is connected as follows. Line 28 is connected to an input port of each of the inverters 14 and 15 and the output ports of inverters 14 and 15 are connected by line 33 to the control port of fluidic amplifier 22. Line 31 is also connected to an input port of each of the inverters 14 and 15 and to pressure source 19. An inverter, of course, produces a binary output opposite that of its binary input. The input port of the amplifier is connected by a line 34 to pressure source 18 which in this example supplies to the amplifier fluid at a pressure of 60 inches of water. The output port of the amplifier is connected by a line 35 to a port 36 (see FIG. 5) of the variable restrictor 23, and the other port 37 of the variable restrictor is connected by line 38 to volume chamber 24. Volume chamber 24 is connected by line 40 to each of the signal pressure ports of isolators 16 and 17. One of the outlet tubes of each of the isolators 16 and 17 is sealed and the other outlet tubes of the isolators 16 and 17 are connected, by lines 41 and 42, to bias pressure sources 20 and 21, respectively.

Pressure source 20, in this example, supplies 10 inches of water pressure and pressure source 21 supplies 40 inches of water pressure. The output port of isolator 16 is connected to line 29 and the output port of isolator 17 is connected by a line 43 to the input port of inverter 11. The output port of inverter 11 is connected to line 30. When the pressure on line 40, which is applied to the signal pressure port of each isolator exceeds, for example, the pressure applied to the inlet tube of isolator 16 via its bias pressure source 20, no flow is permitted from the inlet tube to the outlet port of the isolator. However, when the pressure at the inlet port exceeds the pressure at the signal port (i.e., the pressure in line 40), flow from the inlet port to the outlet port of the isolator takes place. Thus, isolator 16 provides binary signals which depend upon whether the pressure on line 40 is greater or smaller than the pressure from the bias source 20. Similarly, isolator 17 provides binary signals which depend upon whether the pressure on line 40 is greater or smaller than the pressure from the bias source 21.

Figures 3, 4, 5:
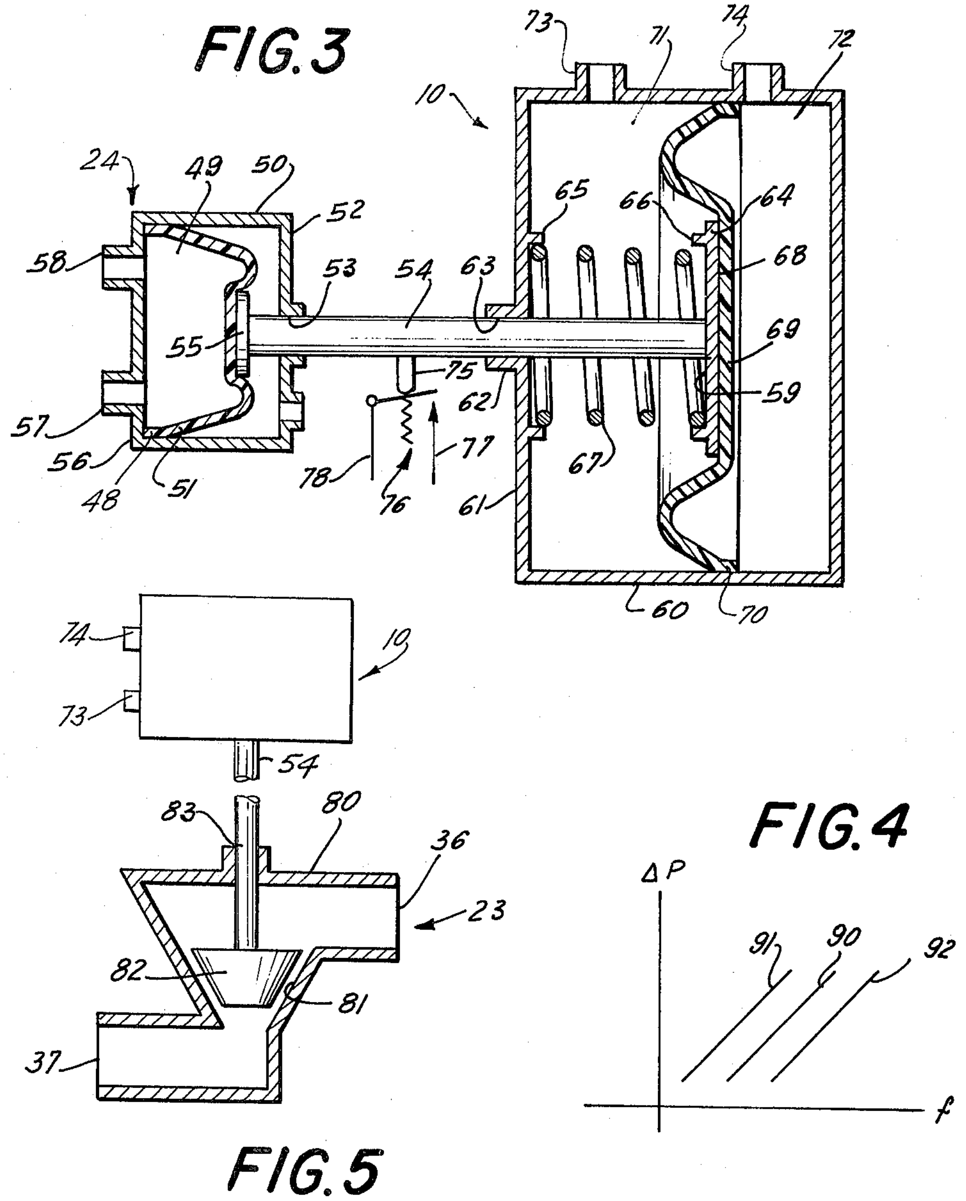
FIG. 3 is a cross-sectional view of a variable volume chamber and a pressure differential drive, shown schematically in FIG. 1.
FIG. 4 is a graphical representation of the frequency response of the oscillator as a function of pressure differentials applied to the drive.
FIG. 5 is a cross-sectional view of a variable restrictor used in the oscillator circuit.

In this embodiment the capacity of the volume chamber 24 is variable. Referring to FIG. 3, in volume chamber 24 a variable volume 49 is provided by a cylindrical housing 50 having a rolling diaphragm 51. The circumferential margin 48 of the diaphragm is sealed to the inside cylindrical wall of the housing. At one end 52 of the housing 50 there is centrally located a hole 53 through which a stem 54 slidably extends, the end of the stem within the housing having connected thereto a disk 55. The disk is fixed, as by a suitable cement, to the center of diaphragm 51. The other end 56 of the housing 50 includes a pair of cylindrical extensions 57 and 58 for coupling the variable volume 49, bounded by the diaphragm 51 and end 56, to lines 38 and 40 respectively. Functionally, when the stem 54 is advanced into the housing 50, the disk 55 abuts and moves diaphragm 51 towards housing end 56, thereby reducing the capacity of volume 49. If, thereafter, the stem 54 is moved outwardly from the housing, the resiliency of the diaphragm enlarges the capacity of volume 49.

Movement of stem 54 is provided by a pressure differential drive 10. Drive 10 includes a cylindrical chamber 60 having an end 61. End 61 includes a cylindrical extension 62 which defines a hole 63 through which stem 54 slidably extends. In the chamber, the stem 54 is connected to the side 59 of a disk 64. End 61 and side 59 of disk 64 include annular extensions 65 and 66, respectively, for supporting around the stem a compression spring 67. Further, the other side 68 of disk 64 is secured to one side of a rolling diaphragm 69, the circumferential margin 70 of which is sealed to the cylindrical wall of chamber 60 to provide a pair of cavities 71 and 72. The cylindrical wall of the chamber includes a pair of cylindrical extensions 73 and 74 which are used, respectively, to establish communication between cavities 71 and 72 and a pressure differential source, such as the inside and outside of a dust collector bag.

Thus, when the pressure in cavity 72 is increased above the pressure in cavity 71, the diaphragm 69 exerts a force on the disk 64, the disk compresses the spring 67, and the stem 54 is moved outwardly from the chamber 60 until the compressed spring 67 provides a force equal to that provided by the pressure differential. Since the force applied by a compressed spring is, to a first approximation, directly related to its linear compression, the amount of movement of the stem 54 is linearly related to the applied pressure differential. Movement of the stem outwardly from the chamber 60 produces movement of the stem into the housing 50. Therefore, as the pressure differential increases the capacity of the volume 49 decreases. The chamber 60 is designed so that variations in pressure in the volume 49 have a negligible effect on the position of the stem 54. As more fully discussed below, between the housing 50 and chamber 60, the stem 54 includes an extension 75 for closing a switch 76, which, when the pressure differential drops below a predetermined value, turns off the oscillator.

Referring to FIG. 5, variable restrictor 23 is a needle valve comprising a conduit 80 having an input port 36, an output port 37, and a conical section 81 which provides a seat for a conical valve member 82. Valve member 82 is connected to the end of a stem 83 slidably extending into the conduit and movement of the stem into or out of the conduit changes the clearance between the valve member 82 and seat 81. The position of stem 83 may be adjusted manually, in which case the drive 10 shown in FIG. 5 would not be present. Thus, movement of the stem varies the flow restriction presented to fluid entering port 36.

Figure 6:
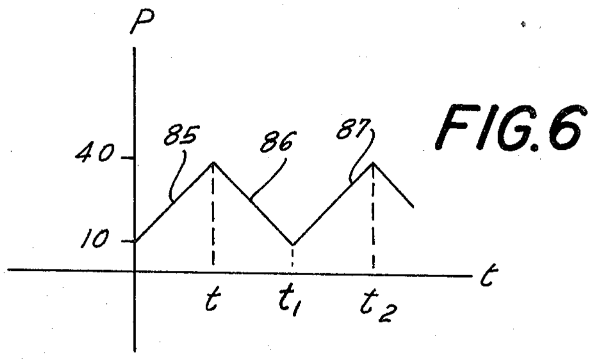
FIG. 6 shows a waveform on a connecting line of the oscillator.

Operatively, if it is assumed that the volume 49 of volume chamber 24 is at some intermediate value, that the setting of the needle valve is adjusted, and that lines 28–31 of the multivibrator 26 are at binary 0 levels (see FIG. 2*a*), the circuit functions as follows. The binary 0 on line 28 causes, via NOR gates 14 and 15, a binary 1 to appear at the control port of amplifier 22 and the pressure source 18 is thereby coupled to line 35. Fluid from the pressure source 18 passes through the variable restrictor 23 and into the volume chamber 24. As a result, the pressure in the volume 49 rises (see 85 in FIG. 6) towards the 60 inch water pressure of the pressure source 18 at a rate which is dependent upon the constriction setting of needle valve 23. If it is assumed that the pressure on line 40 is greater than 10 inches of water the output of isolator 16 provides the binary 0 which was assumed on line 29. With the pressure on line 40 at less than 40 inches of water and rising a binary 1 is present on the output line 43 of isolator 17 and a binary 0 is present on line 30. With binary 0s on lines 29–31, line 28 provides a binary 0 (see FIG. 2a). Thus, for pressure increasing from 10 to 40 inches of water on line 40, the assumed multivibrator states are confirmed.

When the rising fluid pressure on line 40 reaches 40 inches of water, for example, at a time *t* (see FIG. 6) the binary 1 on line 43 changes to a binary 0 and the binary 0 on line 30 changes to a binary 1. Therefore, the binary 0 on line 28 changes to a binary 1 (see FIG. 2*b*), the input to the control port of the amplifier 22 changes to binary 0, and the fluid entering amplifier 22 from source 18 is vented to atmosphere. In consequence, the pressure in volume 49 begins to drop (see 86 in FIG. 6). As the pressure drops from 40 inches of water the binary state on line 43 changes from 0 to 1 and the binary state on line 30 changes from 1 to 0. However, this change does not affect the state of line 28 of the multivibrator 26 (see FIG. 2*c*) and the pressure in the volume 49 continues to drop. When the pressure on line 40, for example, at a time $t_1$, drops slightly below 10 inches of water, the binary state on line 29 changes from 0 to 1. The binary change from 0 to 1 on line 29 drives the binary state on line 28 from 1 to 0 (see FIG. 2d) and the amplifier again couples the pressure source 18 to line 35. Thus, the pressure at line 40 begins to rise again (see 87 in FIG. 6). During its rise the pressure increases above 10 inches of water and when it does so the binary state of line 29 changes from 1 to 0 (see FIG. 2*a*). From the foregoing it may be seen that the circuit now has the same states as it had at the beginning of the described cycle, and therefore, the pressure in the variable volume 49 will rise to 40 inches of water, for example, at time $t_2$. Thus, the circuit oscillates at a frequency F equal to the reciprocal of the time $t_2$—$t$. Typically, line 33 is connected to a load (not shown) and provides thereto a series of pulses at the frequency F.

If the volume 49 is decreased from the intermediate volume assumed, when pressure from source 18 is applied, the pressure in the variable volume 49 reaches a pressure of 40 inches of water in less time than previously, and as a result the frequency of the oscillator increases. Alternatively, if the volume 49 increases, the frequency of the oscillator decreases. Since the volume 49 decreases when the pressure differential applied to the pressure drive 10 increases, increases in the pressure differential causes the frequency of the oscillator to increase.

Referring to FIG. 4, for a range of applied pressure differentials the pressure-frequency relationship 90 of the oscillator is, to a first approximation, linear. If desired, the frequency of the oscillator can also be varied by changing the setting of the variable restrictor 23. For example, if the resistance to fluid flow in the variable restrictor 23 is increased, the time to charge the volume chamber 24 increases, and the range of pressure differentials causes the oscillator to provide a lower range of frequencies (see relationship 91). Alternatively, if the resistance to fluid flow through the variable restrictor 23 is decreased, the output frequency range of the oscillator increases (see relatoinsip 92). Although it is intended that the frequency of oscillation of the oscillator be controlled with variations of the settings of the variable restrictor or variable volume 24, it should be noted that the frequency of oscillation can also be controlled with variations of the pressure supplied by either or both of the pressure sources 20 and 21. The foregoing is possible because the frequency of the oscillator is dependent upon binary switching on lines 29 and 30, and the rate of said switching is dependent upon the pressure difference between the sources 20 and 21.

Referring to FIGS. 1 and 3, when the pressure differential applied to the pressure differential drive 10 decreases below a selectable minimum value, the extension 75 closes the switch 76 and provides via electrical lines 77 and 78 a signal which causes a binary 1 to appear on line 31. The presence of the binary 1 on line 31 inhibits NOR gates 14 and 15 and turns the oscillator off. Although an electrical switch is shown, if desired, other position detectors such as a fluidic position sensor, may be used.

If it is desired that the oscillator provide frequencies over a particular range, the oscillator may be tuned as follows. With the variable volume 49 set at an intermediate level, the setting of the variable restrictor 23 is adjusted until the oscillator functions at a frequency which is in the center of the desired band of frequencies. With this arrangement, pressure responsive volume variations will cause the oscillator to provide frequencies above or below the set center frequency.

As described above, the frequency of the oscillator is varied by use of a variable volume chamber. However, a chamber having a non-variable volume could be employed, and the frequency of the oscillator varied by use of the variable restrictor 23. In such a case, the stem 54 of drive 10 would be connected to the stem 83 of restrictor 23, rather than to the volume chamber. In this way, drive 10 is used to adjust the setting of restrictor 23. It may be mentioned that in such an embodiment, the connection to extensions 73 and 74 would have to be the reverse of the connection when the drive is used with the variable volume chamber. As a result, when the pressure in cavity 71 is increased above the pressure in cavity 72, stem 54 is moved into chamber 60 and opens the restrictor, so that the volume chamber fills more rapidly and the oscillator frequency increases. In all other respects, the oscillator would operate as described above.

It may be mentioned that for convenience of illustration, the usual fluid supply to the fluidic NOR gates of the oscillator has not been shown.

It is to be understood that the description herein of a preferred embodiment according to the invention is set forth as an example thereof and is not to be construed or interpreted as a limitation on the claims which follow and define the invention.

What is claimed is:

1. A fluidic oscillator, comprising:

a. a fluidic bistable device having two input ports and an output port;

b. a volume chamber;

c. means for charging the volume chamber when the output of the bistable device is in a first binary state and discharging the volume chamber when the output is in a second binary state; and d. means, coupling the volume chamber to the input ports, for changing the output of the bistable device from the first state to the second state when pressure in the volume chamber rises above a predetermined level and for changing the output of the bistable device from the second state to the first state when pressure in the volume chamber drops below another predetermined level, whereby the states at the output port change periodically, said means coupling the volume chamber to the input ports including first and second isolator means each having an inlet port and an outlet port, means for applying a pressure at the predetermined level to the inlet port of the first isolator means, means for applying pressure at said another predetermined level to the inlet port of the second isolator means, and means coupling the outlet port of said first isolator means to one of the inputs of the bistable device and the outlet port of said second isolator means to the other input of the bistable device.

2. A fluidic oscillator as defined in claim 1 wherein the outlet port of the second isolator is coupled to said other input by an inverter.

3. A fluidic oscillator, comprising:

a. a fluidic bistable device having two input ports and an output port;

b. a volume chamber;

c. means for charging the volume chamber when the output of the bistable device is in a first binary state and discharging the volume chamber when the output is in a second binary state; said means for charging the volume chamber including at least one NOR gate, the output of the bistable device being connected to an input of said at least one NOR gate; a pressure source; and a fluid amplifier coupled to the volume chamber, to the output of said at least one NOR gate, and to the pressure source; and d. means, coupling the volume chamber to the input ports, for changing the output of the bistable device from the first state to the second state when pressure in the volume chamber rises above a predetermined level and for changing the output of the bistable device from the second state to the first state when pressure in the volume chamber drops below another predetermined level, whereby the states at the output port change periodically.

4. A fluidic oscillator as defined in claim 3 further including means for inhibiting said at least one NOR gate, thereby turning the oscillator off.

5. A fluidic oscillator as defined in claim 4 wherein the capacity of the volume chamber is variable, and including a pressure responsive drive for varying the capacity and controlling said inhibiting means.

* * * * *